(12) United States Patent
Wu et al.

(10) Patent No.: US 8,949,225 B2
(45) Date of Patent: Feb. 3, 2015

(54) INTEGRATING APPLICATIONS WITH AN RDF REPOSITORY THROUGH A SPARQL GATEWAY

(75) Inventors: Zhe Wu, Mountain View, CA (US); Karl Rieb, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/477,362

(22) Filed: May 22, 2012

(65) Prior Publication Data

US 2013/0318070 A1    Nov. 28, 2013

(51) Int. Cl.
*G06F 17/30* (2006.01)
(52) U.S. Cl.
CPC .......... *G06F 17/30595* (2013.01); *G06F 17/30* (2013.01)
USPC .... 707/722; 707/748; 707/803; 707/E17.014; 707/E17.045

(58) Field of Classification Search
CPC .............. G06F 17/30; G06F 17/30569; G06F 11/0709; G06F 1/0751; G06F 17/30578; G06F 17/30292; G06F 17/30427; G06F 17/30563; G06F 17/30592
USPC ......... 707/803, 760, 792, 761, 763, 740, 722, 707/811, E17.014, E17.055, E1.046, 707/E17.044, 999.003, 798, 721, 759, 725, 707/808, E17.002; 709/203, 217, 218, 219; 715/234, 235, 236, 249; 717/137, 143; 710/244
See application file for complete search history.

(56) References Cited

U.S. PATENT DOCUMENTS

| | | | | |
|---|---|---|---|---|
| 7,818,352 | B2* | 10/2010 | Krishnamoorthy et al. | .. 707/803 |
| 7,979,455 | B2* | 7/2011 | Krishnamoorthy et al. | .. 707/761 |
| 8,037,008 | B2* | 10/2011 | Jung et al. | ........................ 706/59 |
| 8,204,856 | B2* | 6/2012 | Meyer et al. | .................. 707/623 |
| 8,484,233 | B2* | 7/2013 | Xie et al. | ...................... 707/758 |
| 2004/0236767 | A1* | 11/2004 | Soylemez et al. | ............. 707/100 |
| 2007/0038609 | A1* | 2/2007 | Wu | ................................... 707/3 |
| 2007/0276197 | A1* | 11/2007 | Harmon | ........................ 600/300 |

(Continued)

OTHER PUBLICATIONS

Droop et al.—"Translating XPath Queries into SPARQL Queries"—OTM 2007 Workshops, Part I, LNCS 4805, pp: 9-10, 2007—Springer-Verlag Berlin Heidelberg, 2007.*

(Continued)

*Primary Examiner* — Anh Ly
(74) *Attorney, Agent, or Firm* — Vista IP Law Group, LLP (57) ABSTRACT

A method, system, and computer program product for of processing database queries using the resource description framework (RDF) language through a gateway service. The method commences by receiving a database query (e.g., an SQL query) from an application, the query being in a first query language format, then converting the query into a SPARQL query format and submitting the converted query to a SPARQL endpoint. The SPARQL endpoint processes the SPARQL query (e.g., by accessing an RDF repository), and sends back the query results. A gateway service (e.g., a SPARQL gateway) then receives the SPARQL query results from the SPARQL endpoint and transforms the SPARQL query results into a format corresponding to the first query language format so the initiating application can process it natively. Several performance features are disclosed, including a method for achieving a quality of service level by concurrently submitting multiple SPARQL queries with different LIMIT clauses.

20 Claims, 9 Drawing Sheets

(56) References Cited

U.S. PATENT DOCUMENTS

| | | | |
|---|---|---|---|
| 2009/0106234 A1* | 4/2009 | Siedlecki et al. | 707/5 |
| 2009/0138437 A1* | 5/2009 | Krishnamoorthy et al. | 707/3 |
| 2009/0138498 A1* | 5/2009 | Krishnamoorthy et al. | 707/103 R |
| 2010/0049763 A1* | 2/2010 | Jung et al. | 707/721 |
| 2010/0124216 A1* | 5/2010 | Ku | 370/352 |
| 2010/0165947 A1* | 7/2010 | Taniuchi et al. | 370/331 |
| 2010/0185643 A1* | 7/2010 | Rao et al. | 707/759 |
| 2010/0281053 A1* | 11/2010 | Braines et al. | 707/770 |
| 2011/0047178 A1* | 2/2011 | Song | 707/769 |
| 2011/0113072 A1* | 5/2011 | Lee et al. | 707/802 |
| 2012/0102022 A1* | 4/2012 | Miranker et al. | 707/713 |
| 2012/0102472 A1 | 4/2012 | Wu et al. | |
| 2012/0179644 A1* | 7/2012 | Miranker | 707/605 |
| 2012/0271860 A1* | 10/2012 | Graham et al. | 707/798 |
| 2013/0318070 A1* | 11/2013 | Wu et al. | 707/722 |
| 2013/0329723 A1* | 12/2013 | Ku | 370/352 |
| 2013/0332473 A1* | 12/2013 | Ryman | 707/754 |
| 2014/0025694 A1* | 1/2014 | Ryman | 707/756 |

OTHER PUBLICATIONS

"From Domain Ontologies to Modeling ontologies to Exwcutable Simulation Models"—Gregory A. Silver, Osama Al-Haj Hassan and John A. Miller—University of Georgia—Proceedings of the 2007 Winter Simulation Conference, Dec. 9-12, 2007—(pp. 1108-1117).*

Jong-Hoon Lee; Jung-Tae Kim; Hoon-Ki Lee; Eui-Hyun Paik—"Design and implementation of the Geo-Context Engine for semantic social media service"—Published in: Internet Technology and Secured Transactions (ICITST), 2011 International Conference for Date of Conference: Dec. 11-14, 2011—pp. 383-387.*

L. Ding et al. "TWC LOGD: A Portal for Linked Open Government Data Ecosystems"—The Jounal of Web Semenatics, vol. 9, Issue 3, Sep. 2011, pp. 325-333.*

"Semantic Web Activity", 2011, W3C, 5 pages, http://www.w3.prg/2001/sw/.

"RDF/XML Syntax Specification (Revised)", W3C Recommendation, W3C, Feb. 10, 2004, 33 pages, http://www.w3.org/TR/REC-rdf-syntax/.

"RDF Primer", W3C Recommendation, W3C, Feb. 10, 2004, 55 pages, http://www.w3.org/TR/rdf-primer/.

"SPARQL Query Language for RDF", W3C Recommendation, W3C, Jan. 15, 2008, 90 pages, http://www.w3.org/TR/rdf-sparql-query/.

"Apache Jena", The Apache Software Foundation, Version 2.0, Dec. 2011, 2 pages, http://jena.sourceforge.net/.

"openRDF.org", home of Sesame, Aduna, 1997-2012, 1 page, http://www.openrdf.org/.

"SPARQL Protocol for RDF", W3C Recommendation, W3C, Jan. 15, 2008, 19 pages, http://www.w3.org/TR/rdf-sparql-protocol/.

"RDF Semantics", W3C Recommendation, W3C, Feb. 10, 2004, 55 pages, http://www.w3.org/TR/rdf-mt/.

"Software Downloads", Oracle, May 14, 2011, 3 pages url: http://www.oracle.com/technology/software/tech/semantic_technologies/index.html.

"Linked Data, Connect Distributed Data across the Web", May 1, 2011, 1 page url: http://linkeddata.org/.

"Oracle Business Intelligence Enterprise Edition Plus", Oracle, Aug. 3, 2010, 2 pages url: http://www.oracle.com/technetwork/middleware/bi-enterprise-edition/overview/index.html.

"Oracle Database 11g Release 2 Semantic Technologies Using the Jena Adaptor for Oracle Databse", Sep. 2009, 24 pages url: http://download.oracle.com/otndocs/tech/semantic_web/pdf/semtech11gr2_jenaadapt-tl.pdf.

* cited by examiner

```
<text>
  <row>
    <s> entry23631 </s>
    <class_ticker> WPSGX </class_ticker>
    <series_name> STEWART W P & CO GROWTH FUND INC </series_name>
    <class_name> STEWART W P & CO GROWTH FUND INC </class_name>
    <zip_code> 10022 </zip_code>
    <state> NY </state>
    <city> NEW YORK </city>
    <entity_org_type> 30 </entity_org_type>
    <address_1> 527 MADISON AVENUE </address_1>
    <address_2>
  </row>
  <row>
    <s> entry476 </s>
    <class_ticker> FCNTX </class_ticker>
    <series_name> Fidelity Contrafund </series_name>
    <class_name> Fidelity Contrafund </class_name>
    <zip_code> 2109 </zip_code>
    <state> MA </state>
    <city> BOSTON </city>
    <entity_org_type> 30 </entity_org_type>
    <address_1> FIDELITY INVESTMENTS COMPANY </address_1>
    <address_2> 82 DEVONSHIRE STREET </address_2>
  </row>
  <row>
    <s> entry475 </s>
    <class_ticker> FINSX </class_ticker>
    <series_name> Fidelity Advisor New Insights Fund </series_name>
    <class_name> Institutional Class </class_name>
    <zip_code> 2109 </zip_code>
    <state> MA </state>
    <city> BOSTON </city>
    <entity_org_type> 30 </entity_org_type>
    <address_1> FIDELITY INVESTMENTS COMPANY </address_1>
    <address_2> 82 DEVONSHIRE STREET </address_2>
  </row>
  <row>
    <s> entry473 </s>
```

INTEGRATING APPLICATIONS WITH AN RDF REPOSITORY THROUGH A SPARQL GATEWAY

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The disclosure relates to the field of processing database queries using the resource description framework (RDF) language, and more particularly to techniques for integrating applications with an RDF repository through a SPARQL gateway.

BACKGROUND

Some embodiments of the present disclosure are directed to an improved approach for integrating applications with an RDF repository, specifically through a SPARQL gateway.

The resource description framework (RDF) language is a powerful language, and is a technology that is used extensively in implementations of the "semantic web". The term SPARQL (pronounced "sparkle") refers to a protocol using the RDF query language that is designed as a query language for databases. SPARQL is intended to federate certain uses of RDF, and SPARQL became an official "World Wide Web Consortium" (W3C) recommendation in 2008. Database engines that process queries coded in SPARQL are able to retrieve and manipulate data stored in the resource description framework format. SPARQL allows for a query to consist of "triple" patterns, conjunctions, disjunctions, and optional patterns, and standards-compliant responses to a SPARQL query are returned in an XML format.

Integrating existing applications with semantic data sources poses a challenge. Many existing applications do not natively support construction of queries in SPARQL, nor do they natively handle SPARQL query responses. That is, execution of a SPARQL query would return a query response in an XML format, and legacy applications do not natively support handle such SPARQL query responses as returned in an XML format. In order to consume a SPARQL query response in XML, application integrators have few technologies at their disposal. In one possibility, the application developer can parse the XML format returned by the SPARQL and transform it into a data structure that is natively consumable by the existing application. This task can be difficult for legacy applications or applications that are not flexible with their input. It is even harder for already deployed applications and third party applications because code changes may not be feasible. In another possibility, the database that services the SPARQL query can be customized so it returns the query response in the desired (e.g., application-specific) format. Yet, this architectural choice is not desired inasmuch as implementation of such application-specific formats is anathema to the notion of a standard interface that is the motivation for SPARQL.

The aforementioned implementation possibilities suffer from additional and severe limitations. Therefore, there is a need for an improved approach to perform integrating applications with an RDF repository.

SUMMARY

The present disclosure provides an improved method, system, and computer program product suited to address the aforementioned issues with legacy approaches. More specifically, the present disclosure provides a detailed description of techniques used in methods, systems, and computer program products for integrating applications with an RDF repository through a SPARQL gateway.

Disclosed are methods and systems for processing a native database query using through a gateway service in order to access a SPARQL endpoint that uses the resource description framework (RDF) language. The method commences by receiving a database query (e.g., an SQL query, a query in XQUERY format, a query formatted as an HTTP request, etc.) from an application then converting the database query into a SPARQL query format and submitting the converted query to the SPARQL endpoint. The SPARQL endpoint processes the SPARQL query (e.g., by accessing an RDF repository), and sends back the query results in an XML format. A gateway service (e.g., a SPARQL gateway) then receives the SPARQL query results from the SPARQL endpoint and transforms the SPARQL query results into a format corresponding to the native (e.g. SQL) query language format so the initiating application can process it natively. Several performance features are disclosed, including a method for achieving a quality of service level by concurrently submitting multiple SPARQL queries with different LIMIT clauses.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 5 depicts transformed query results as transformed by a SPARQL gateway used in a system integrating applications with an RDF repository through a SPARQL gateway, according to some embodiments.

DETAILED DESCRIPTION

Some embodiments of the present disclosure are directed to an improved approach for implementing integrating applications with an RDF repository through a SPARQL gateway. More particularly, disclosed herein are environments, methods, and systems for implementing integrating applications with an RDF repository through a SPARQL gateway.

Overview

The term "Semantic Web" or "semantic web" refers to technologies used for representing knowledge and information, for identifying resources, for classifying data, and for relating/linking information together. To model knowledge and information in a flexible and extensible way, the World Wide Web Consortium (W3C) has standardized the Resource Description Framework (RDF) to identify resources and capture the semantics of data. The RDF defines a graph modeling language. The basic construction unit of RDF data is the so-called "triple" which consists of three fields: a subject, a predicate, and an object. As an example, note the triple below:

<http://www.oracle.com/><rdf:type><ns:DatabaseCompany>

The above triple is a triple representing a statement (using the shown RDF construct) that Oracle is a database company. In this triple, the URL "http://www.oracle.com/" is the subject, "<rdf:type>" is the predicate (shortened here for readability, the full URI is http://www.w3.org/1999/02/22-rdf-syntax-ns#type), and "<ns:DatabaseCompany>" is the object. One way to look at this triple is that two resources identified by "http://www.oracle.com/" and "<ns:DatabaseCompany>" are related or linked by a relationship identified by "<rdf:type>". The two resources are sometimes presented as vertices in a graph while the relationship is represented as an edge connecting the two vertices. As more and more triples are added to such a graph, they form a directed graph that allows graph pattern matching and navigation. And as more and more graphs are made available within an enterprise's intranet or on the Internet, they form linked data. In some cases such graphs are made public. The graph known as "Open Linked Data" (see www.linkeddata.org) is such an example.

Of course commercial database implementations (e.g., Oracle 11g) have been deployed since long before the W3C or any of the W3C recommendations. While such commercial database implementations are apt to manage storage of any variety of objects and relationships, and while such commercial implementations offer well-developed database storage capabilities and database query capabilities (e.g., SQL) their utility can be improved by the herein-disclosed SPARQL gateway technologies.

Further details regarding general approaches to techniques disclosed herein are described in U.S. Publication No. US 2012/0102472, which is hereby incorporated by reference in entirety.

DESCRIPTIONS OF EXEMPLARY EMBODIMENTS

Figure 1A:
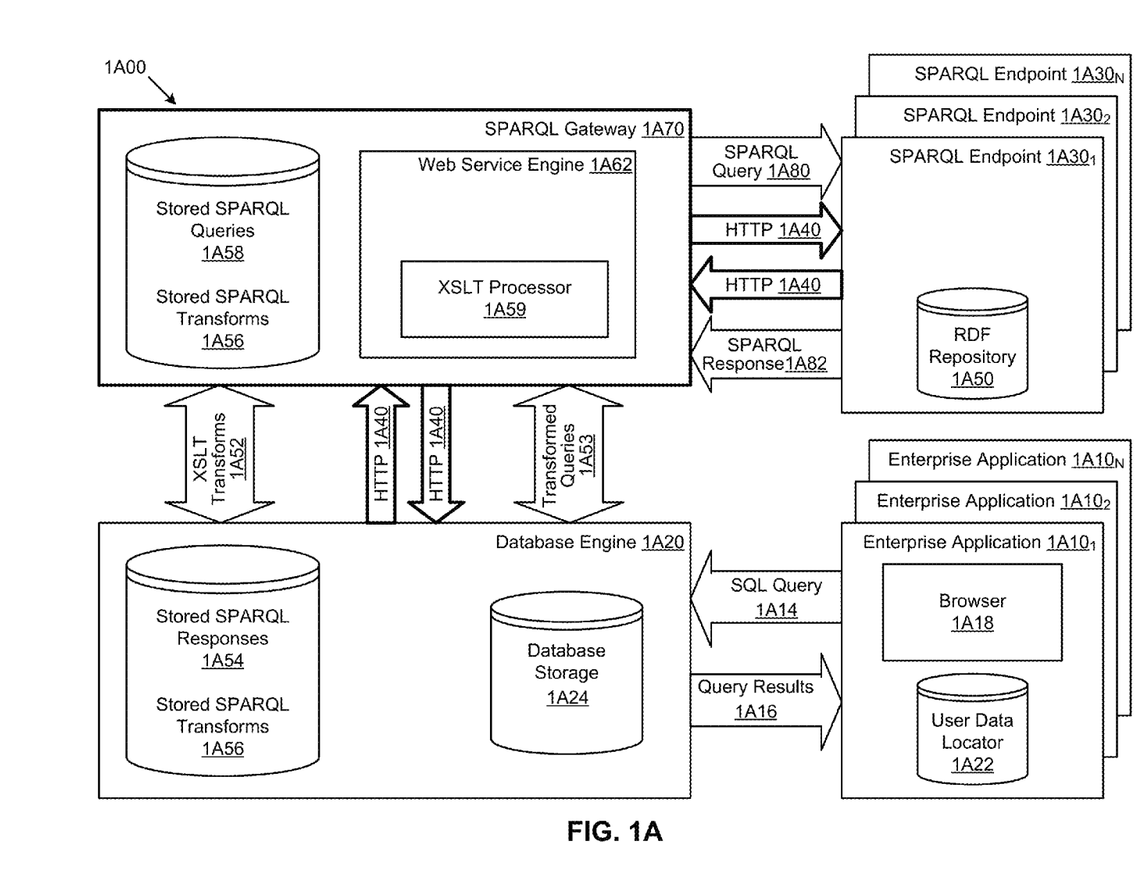
FIG. 1A depicts a system for integrating applications with an RDF repository through a SPARQL gateway, according to some embodiments.

FIG. 1A depicts a system 1A00 for integrating applications with an RDF repository 1A50 through a SPARQL gateway 1A70. As an option, the present system 1A00 may be implemented in the context of the architecture and functionality of the embodiments described herein. Also, the system 1A00 or any aspect therein may be implemented in any desired environment.

As shown, FIG. 1A depicts an application (e.g., enterprise application 1A10$_1$, enterprise application 1A10$_2$, enterprise application 1A10$_N$, a database application, etc.) in communication with a database engine 1A20 via a query (e.g., SQL query 1A14). The database engine processes the query and returns results of the query (e.g., query results 1A16) to the requesting application. The results of the query are viewed in a graphical user interface (e.g., browser 1A18) or other interface as may be used by the application. Further, a query (e.g., SQL query 1A14) can be regarded as data belonging to the application, and any extent or forms of queries or other user data can be stored in a persistent storage accessible to the application (e.g., user data locator 1A22). The extent or forms of queries as accessible to the application can be stored within the application, or the extent or forms of queries can be made accessible via pointers or references, and (as shown) a user data locator 1A22 can be employed by the application to retrieve a user query or other data, wherever located.

Execution of a query and the presentation of the returned query results for processing and display by the requesting entity provides a rich environment for a wide range of applications that rely on some forms of database storage 1A24. Yet such techniques can be extended to access RDF data, and such extensions offer further capabilities of the heretofore-described database environment.

Extending the system components as hereto described offers techniques to convey SPARQL queries and updates to a SPARQL processing service and to return the results via HTTP to the entity that requested them. Various forms of SPARQL processing services are possible, and as shown a SPARQL processing service can take the form of a SPARQL endpoint (e.g., SPARQL endpoint 1A30$_1$, SPARQL endpoint 1A30$_2$, SPARQL endpoint 1A30$_N$, etc.). In the embodiment of FIG. 1, the specific technique used for conveying SPARQL queries and updates to a SPARQL processing service is shown as HTTP 1A40. Of course, communications following the protocol of HTTP can be bi-directional, as shown. Furthermore, the content of the communications over HTTP can be defined a priori, for example by a specification or recommendation of the W3C (e.g., see the HTTP communication to/from a SPARQL endpoint). Or, content of the communications over HTTP can be defined, for example by a database company (e.g., see the HTTP communication to/from the SPARQL gateway 1A70).

Having access to RDF data (e.g., using a SPARQL processing service) facilitates many use models. For example, having access to RDF data (e.g., using a SPARQL processing service allows application developers to query RDF data stored in the Oracle database by submitting a SPARQL query to the SPARQL processing service using the SPARQL gateway). The SPARQL endpoint returns the results of the query in a W3C standardized XML format. In a W3C standards-compliant system, a SPARQL endpoint receives a standards-compliant SPARQL query 1A80 and the SPARQL endpoint respond with a standards-compliant SPARQL response 1A82. The protocol (e.g., HTTP) or protocols used are compliant with the applicable W3C standards.

An example SPARQL query is given in Table 1. The SPARQL query in its entirety selects several variables from an RDF dataset. In this example, the SPARQL query selects persons (see Table 1 line 3), their names (see Table 1 line 3 "ns:name"), and their friends (see Table 1 line 3). Additionally this query selects the existence of their friends (see Table 1 line 4) as well as the names of their friends. The question mark '?' denotes a variable. In this case, there are the four variables as described: ?person, ?name, ?friend, and ?friend_name, and they are to be bound respectively to values found in the queries dataset.

TABLE 1

Annotated SPARQL Query

| Line | SPARQL Query |
| --- | --- |
| 1 | PREFIX ns: <http://example.com> |
| 2 | SELECT ?person ?name ?friend ?friend_name |
| 3 | Where    {        ?person    ns:name           ?name . |
| 4 |                        ?person    ns:hasFriend     ?friend . |
| 5 |                        ?friend    ns:name           ?friend_name |
| 6 |           } |

The format of the query result (e.g., SPARQL response 1A82) of the above query is defined by the SPARQL standard. The SPARQL standard specifies formats that comply with the XML standard. One example output is provided in Table 2. Each <result> node defines one solution satisfying the query. The constructions inside each <result> node define a set of bindings for the selected variables.

TABLE 2

Annotated SPARQL Response

| Line | SPARQL Query Results |
| --- | --- |
| 1 | <sparql |
| 2 |     xmlns="http://www.w3.org/2005/sparql-results#" |
| 3 |     xmlns:xsi="http://www.w3.org/2001/XMLSchema-instance" |
| 4 | xsi:schemaLocation="http://www.w3.org/2001/sw/DataAccess/rf1/result2.xsd" |
| 5 | > |
| 6 |     <head> |
| 7 |         <variable name="person"/> |
| 8 |         <variable name="name"/> |
| 9 |         <variable name="friend"/> |
| 10 |         <variable name="friend_name"/> |
| 11 |     </head> |
| 12 |  |
| 13 |      |
| 14 |         <result> |
| 15 |             <binding name="person"> |
| 16 |                 <uri>http://example.com/John</uri> |
| 17 |             </binding> |
| 18 |             <binding name="name"> |
| 19 |                 <literal>John Smith</literal> |
| 20 |             </binding> |
| 21 |             <binding name="friend"> |
| 22 |                 <uri>http://example.com/Mary</uri> |
| 23 |             </binding> |
| 24 |             <binding name="friend_name"> |
| 25 |                 <literal>Mary Sue</literal> |
| 26 |             </binding> |
| 27 |         </result> |

To make RDF data available to any application (e.g., enterprise application 1A10$_1$, enterprise application 1A10$_2$, enterprise application 1A10$_N$, etc.), the SPARQL gateway provides a web service (e.g., web service engine 1A62) that serves to bridge communication (e.g., a SPARQL query, a SPARQL response, etc.) to any SPARQL endpoint, regardless of the RDF store used by the SPARQL endpoint. Processing within the SPARQL gateway (including processing within the web service engine 1A62) allows applications to consume semantic data in formats other than the specific XML defined for any particular SPARQL response. A SPARQL response so processed can be provided to a database engine, and communication between such a database engine and a SPARQL gateway can cover an extremely wide range of cases. In some cases an RDF graph engine 250 is included or integrated within the web service engine 1A62. In exemplary embodiments, the RDF engine 250 receives a SPARQL query, causes a SPARQL endpoint to execute the SPARQL query, and processes a standards-compliant SPARQL response 1A82 that results from the execution of the SPARQL query.

As shown, the gateway behaves as a processing layer between an application and SPARQL endpoints; the SPARQL gateway is a process that is entirely separate from the applications, and is separate from the SPQRQL endpoints. Such a sequestered processing layer provides a layered architecture as well as a separate processing entity into which additional functionality useful for application integration. For example, using the SPARQL gateway 1A70, an application developer can integrate with the capabilities of a database engine (e.g., Oracle's OBIEE) and any SPARQL endpoint such that database engine can use the semantic data retrieved from the SPARQL endpoint. More specifically, an application, and/or a database engine can provide a native-language query (e.g., an SQL query) along with an identification of a SPARQL endpoint to a SPARQL gateway, and the identified SPARQL endpoint returns a SPARQL response to the SPARQL gateway. The SPARQL gateway in turn provides results to the database engine in a format native to the database engine, or at least in such a format that the database engine can use the semantic data retrieved from the SPARQL endpoint.

As herein described and shown in the figures, the SPARQL gateway provides a solution that is agnostic to characteristics of standards-compliant SPARQL endpoints. Moreover the SPARQL gateway provides a solution that is agnostic to characteristics of the application that uses the semantic data. As such, use of the SPARQL gateway does not require any modification to the code base of existing applications. Such an architecture facilitates use of semantic data by third party and legacy applications.

As can be understood, the SPARQL gateway receives a SPARQL response from a SPARQL endpoint, and proceeds to process the SPARQL response into a format native to the database engine, or at least in such a format that the database engine can use the semantic data retrieved from the SPARQL endpoint. In some embodiments, such processing is facilitated using the "EXtensible Stylesheet Language", known as XSLT. Any number of stylesheets embodied in any of various forms (e.g., compressed, uncompressed, encoded, etc.) of the XSLT stylesheets can be persisted as a stored SPARQL transform, and can be used on demand to process semantic data retrieved from the SPARQL endpoint in the format of a SPARQL response, and be transformed using an XSLT processor 1A59.

Still further referring to the embodiment of FIG. 1A, the SPARQL gateway can comprise a storage facility (e.g., a persistent storage device) that serves to store one or more instances of a stored SPARQL transform 1A56. Such a collection of transforms (e.g., instances of a stored SPARQL transform 1A56) can be stored within the SPARQL gateway, or a collection of transforms (e.g., instances of a stored SPARQL transform 1A56) can be stored in any other alternate location accessible to the SPARQL gateway. One possible alternate location is shown, where a stored SPARQL transform 1A56 is stored within the database engine 1A20. Even further, the user data locator 1A22 can serve to persist a stored SPARQL transform 1A56, or, the user data locator 1A22 can serve to merely refer to a location of a stored SPARQL transform 1A56. In some embodiments the location of a stored SPARQL transform 1A56 may be in a persistent storage within the database engine 1A20 (as shown).

Continuing with the discussion of FIG. 1A, in some embodiments one or more instances of a SPARQL response 1A82 can be cached. For example, one or more instances of a SPARQL response 1A82 be stored within the SPARQL gateway, and made accessible via a cache comprising stored SPARQL responses.

Figure 1B:
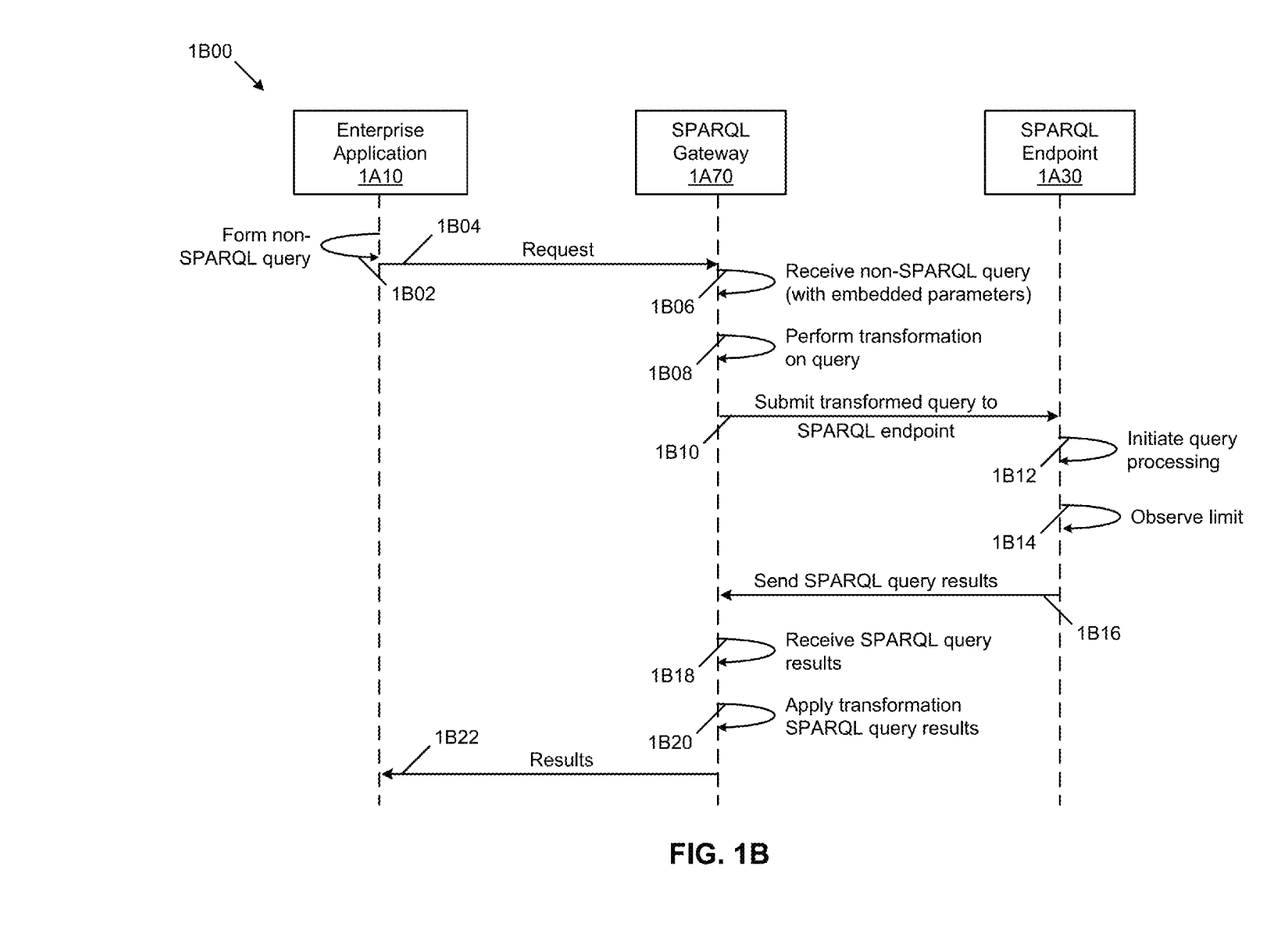
FIG. 1B depicts a protocol for integrating applications with an RDF repository through a SPARQL gateway, according to some embodiments.

FIG. 1B depicts a protocol 1B00 for integrating applications with an RDF repository through a SPARQL gateway. As an option, the present protocol 1B00 may be implemented in the context of the architecture and functionality of the embodiments described herein. Also, the protocol 1B00 or any aspect therein may be implemented in any desired environment.

As shown, protocol 1B00 commences when an instance of an enterprise application 1A10 (e.g., enterprise application 1A10₁) forms a native query such as a non-SPARQL query (see message 1B02), and passes the native query to the SPARQL gateway (see message 1B04). The SPARQL gateway 1A70 receives the non-SPARQL query (see operation 1B06) and proceeds to perform a conversion on the received query (see operation 1B08). Having completing converting the non-SPARQL query into a SPARQL query, the SPARQL gateway submits the SPARQ query to a SPARQL endpoint 1A30 (see message 1B10), and the SPARQL endpoint 1A30 proceeds to process the submitted SPARQL query (see operation 1B12). In some situations the SPARQL endpoint 1A30 performs additional processing, such as to observe some limits (see operation 1B14). Having processed the SPARQL query, the SPARQL endpoint 1A30 sends the results as a SPARQL response (see message 1B16). The SPARQL response is received by the SPARQL gateway (see operation 1B18) and commences to apply a transform to the SPARQL response (see operation 1B20). The protocol as shown concludes upon sending the transformed SPARQL query results to the application, thus ending the shown protocol phase when the transformed results are passed to the enterprise application (see message 1B22).

Of course, the foregoing protocol is merely one example of a protocol that can be observed by a SPARQL gateway. Additional features and messages and operations are possible, and are herein further described.

Figure 2:
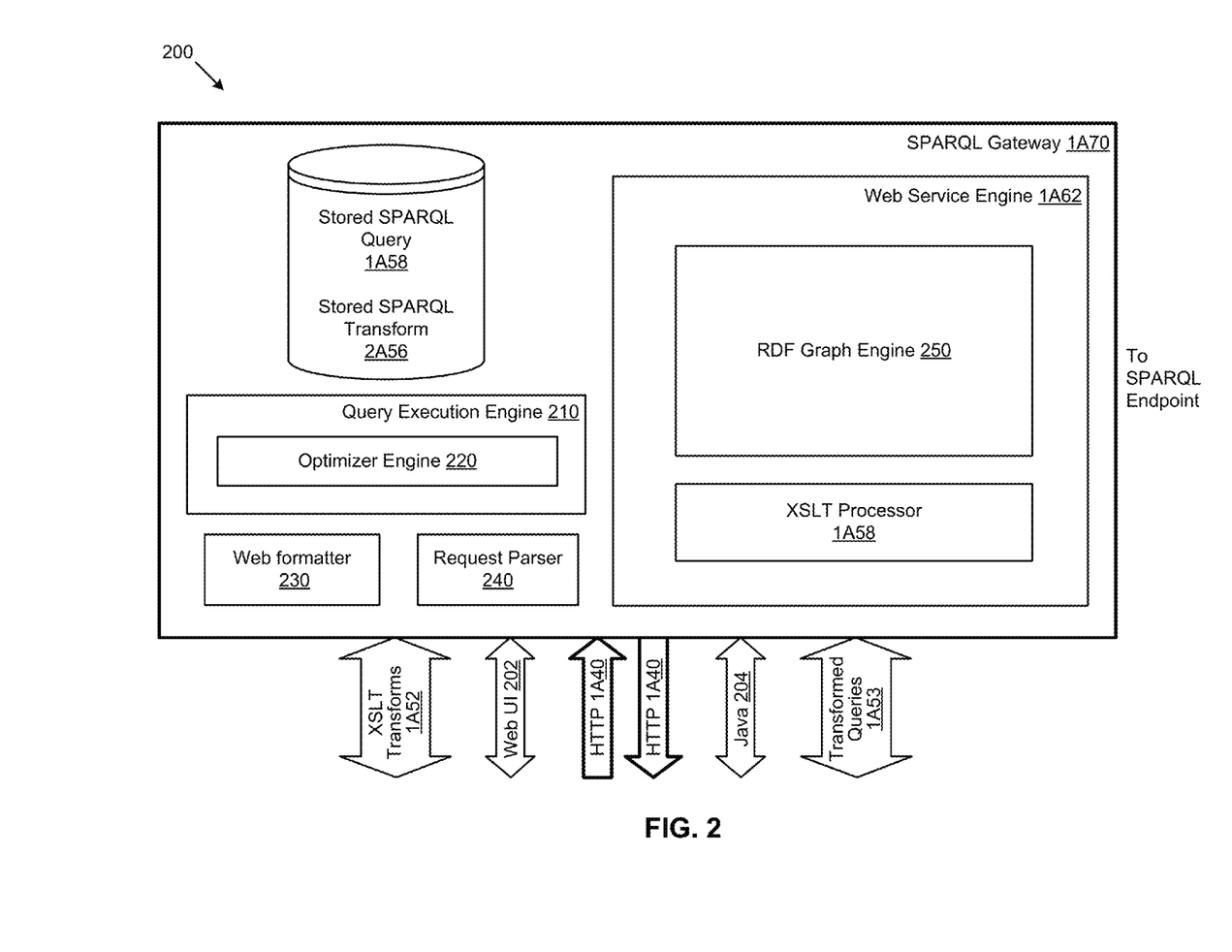
FIG. 2 is a block diagram of a SPARQL gateway for integrating applications with an RDF repository through a SPARQL gateway, according to some embodiments.

FIG. 2 is a block diagram 200 of a SPARQL gateway for integrating applications with an RDF repository through a SPARQL gateway. As an option, the present block diagram 200 may be implemented in the context of the architecture and functionality of the embodiments described herein. Also, the block diagram 200 or any aspect therein may be implemented in any desired environment.

The embodiment of FIG. 1A includes a SPARQL gateway 1A70 in communication with a database engine 1A20 and multiple instances of SPARQL endpoints. This architecture provides capabilities not possible using the aforementioned legacy techniques. For example, and as earlier indicated, adding an XML parser or equivalent processing to process a SPARQL query response often involves making changes to existing applications, which may not be possible. Such is the situation for third party software applications, or applications for which software is in production or is already running at installation sites.

As another example of the capabilities of a SPARQL gateway, using the SPARQL gateway architecture supports integration of any application with any RDF web service endpoint. In addition, aspects of the SPARQL gateway provide quality of service (QOS) features that are absent from the SPARQL standard.

Aspects of the aforementioned QOS capabilities can be implemented using query optimization and/or deployment of a SPAQL gateway on a physical machine with resources (e.g., processor, memory, I/O, etc.) that are configured to support low latency operation.

In some cases a SPARQL gateway can implement a request parser 240 that serves to recognize requests and/or transformations that are used repeatedly, and to cache those requests, for example in a local memory or other fast memory that supports fast, low-latency access to a stored SPARQL query 1A58, and/or to cache those transforms, for example in a local memory or other fast memory that supports fast, low-latency access to a stored SPARQL transform 1A56.

Also, in some cases, a SPARQL gateway can implement a web formatter 230 that serves to pre-process results of a query for fast transmission and/or fast rendering when viewed in a graphical user interface (e.g., browser 1A18) or other interface as may be used by the applications. Output from a SPARQL gateway can be compressed (e.g., using a web formatter 230) and provided to applications that can accept a compressed data stream, thus reducing network traffic.

In still other cases a SPARQL gateway can implement a query execution engine 210 that serves to pre-process received queries for fast execution by a SPARQL endpoint. For example, query execution engine 210 can use an optimizer engine 220 to determine if a database query can be converted into more than one equivalent SPARQL query, and if so, the query execution engine 210 selects the fastest one from among the equivalent SPARQL queries.

Also, query execution engine 210 can perform various QOS optimizations, some of which optimizations and/or QOS service levels are detailed in the following discussion of FIG. 3.

Figure 3:
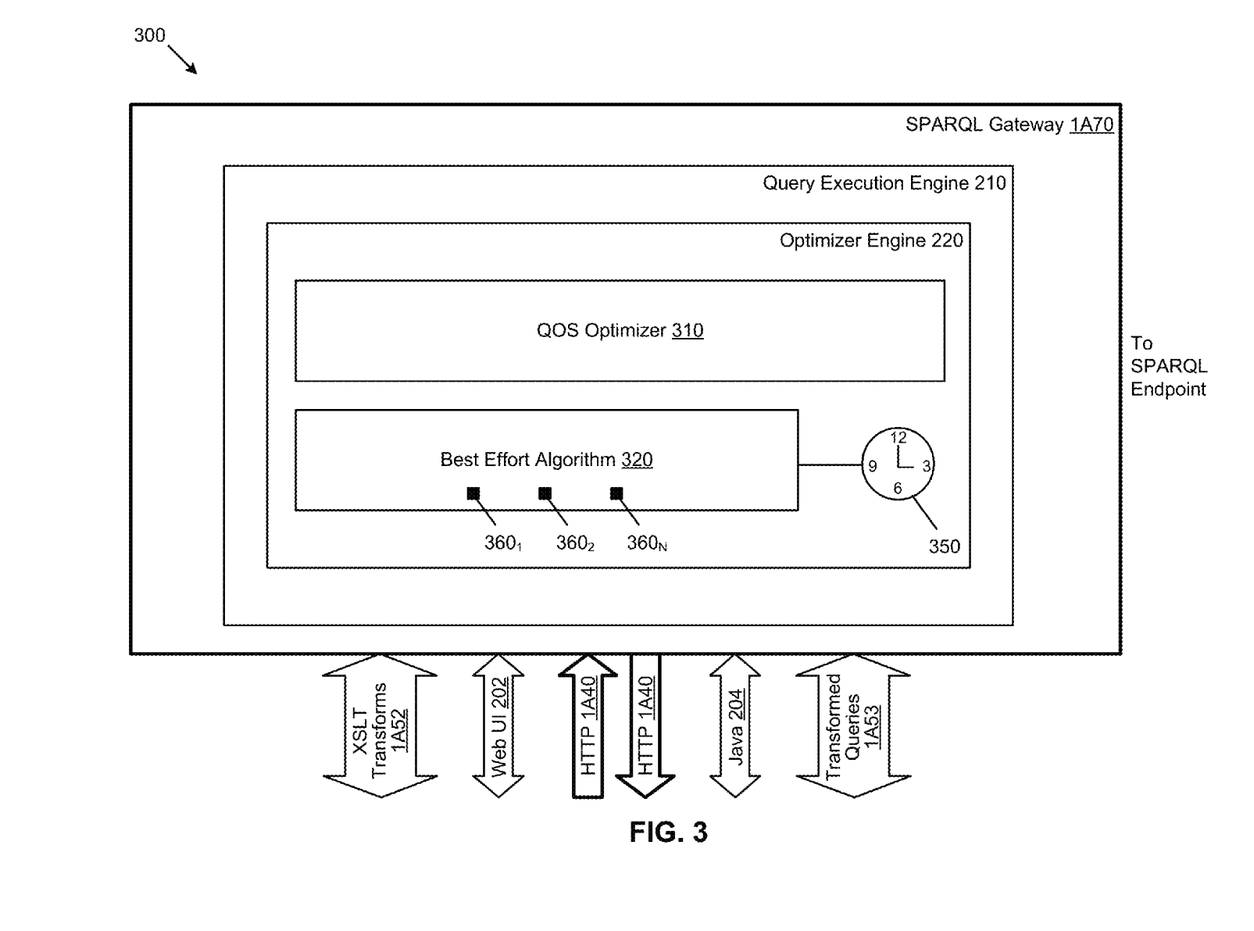
FIG. 3 is a block diagram of a SPARQL query execution engine for integrating applications with an RDF repository through a SPARQL gateway, according to some embodiments.

FIG. 3 is a block diagram 300 of a SPARQL query execution engine for integrating applications with an RDF repository through a SPARQL gateway. As an option, the present block diagram 300 may be implemented in the context of the architecture and functionality of the embodiments described herein. Also, the block diagram 300 or any aspect therein may be implemented in any desired environment.

As earlier indicated, the SPARQL W3C standard does not define any quality of service metrics or quality of service metrics constraints. Yet, in some cases a SPARQL endpoint might be backed by a large RDF dataset, and some particular SPARQL query may take a long time to finish. This makes it difficult to integrate semantic data sources with applications that have a response time constraint.

To address the missing quality of service constraints in the SPARQL standard, a SPARQL gateway can implement QOS optimizer 310 to facilitate a "best effort" query execution algorithm that leverages SPARQL syntax (e.g., the LIMIT clause). The "best effort" algorithm issues multiple queries in order to provide as much data as possible in a time constrained environment against any SPARQL endpoint.

Legacy approaches use a timer to stop a query after reaching the time constraint. However, such legacy approaches are undesirable since using a timer means the application might receive no results if the timer expires (i.e., time runs out) before the query results are returned. The disclosed best-effort query execution algorithm solves this problem by issuing multiple queries with different values expressed in the respective LIMIT clauses. The LIMIT clauses will force the query to return at most a specified number (e.g., the LIMIT) of results. Specifying a LIMIT clause can significantly reduce the query response time for otherwise long-running queries. The best effort algorithm will issue queries with increasing LIMIT values until reaching a time duration constraint. After time expires for the query (e.g., the time duration constraint has been reached or exceeded), the algorithm returns the results it acquired from the previously completed LIMIT queries.

For example, assume the SPARQL query would return 100,000 matches (if allowed to run to completion) and the application has a three second response time constraint. Depending on the available network bandwidth and load on the SPARQL endpoint, transporting 100,000 matches from a SPARQL web service endpoint to the application within three seconds may not be possible. In this case, the best-effort query optimization will set a timer 350, and issue a set of queries in the following form as shown in Table 3.

TABLE 3

Annotated SPARQL Query with a LIMIT Clause

| Line | SPARQL Query | | | |
|---|---|---|---|---|
| 1 | PREFIX ns: <http://example.com> | | | |
| 2 | SELECT ?person ?name ?friend ?friend_name | | | |
| 3 | Where | { | ?person ns:name | ?name . |
| 4 | | | ?person ns:hasFriend | ?friend . |
| 5 | | | ?friend ns:name | ?friend_name |
| 6 | | } | | |
| 7 | LIMIT | <n> | | |

Note on line 7 the LIMIT clause that is added to the end of the query. In an exemplary implementation of the best effort algorithm 320, multiple queries are sent to the SPARQL endpoint, each with a different LIMIT. In one implementation, the different LIMIT values are increased exponentially. For example, a first LIMIT value can start with n=1 and increase the values (e.g., limit value $360_1$, limit value $360_2$, limit value $360_N$, etc.) exponentially as in {1, 8, 64, 512, 4096 . . . etc.}. A query with "LIMIT 1" is more likely to complete within a given time constraint than a query with a higher LIMIT. After receiving all the query output from a small query to a SPARQL endpoint, further queries with larger LIMIT settings can be sent out if the execution time constraint has not been violated. It is also possible to send out queries with different LIMIT settings in parallel.

Now, returning to FIG. 1A, implementations of the SPARQL gateway 1A70 provide an open framework for management of metadata including transformations (e.g., shown as XSLT transformations 1A52), and transformed SPARQL queries (e.g., shown as transformed queries 1A53). Additionally, a SPARQL gateway can store SPARQL query responses (e.g., shown as stored SPARQL responses 1A54). Such a framework gives application developers the flexibility to store XSLTs and SPARQL queries in the most convenient location for their application. More specifically, the framework supports storing transformations and queries in a database engine (e.g., in an Oracle database), or as files in a file system, or on a remote web server and accessed by a URL. As earlier indicated, some embodiments of a SPARQL gateway support caching of query results for certain SPARQL queries (e.g., frequently reused queries).

One possible technique for an application to interact with a SPARQL Gateway is through a URL with the following format:

http://host:port/sparqlgateway/sg?
<SPARQL_ENDPOINT>&<SPARQL_QUERY>&<XSLT> where:
<SPARQL_ENDPOINT> specifies the ee parameter, which contains a URL encoded form of a SPARQL endpoint.
For example, ee=http %3A %2F %2Fsparql.org %2Fbooks is the URL encoded string for SPARQL endpoint http://sparql.org/books. It means that SPARQL queries are to be executed against endpoint http://sparql.org/books.
<SPARQL_QUERY> specifies either the SPARQL query, or the location of the SPARQL query.
<XSLT> specifies either the XSL transformation, or the location of the XSL transformation.

If it is not feasible for an application to accept a long URL, an application can specify the location (e.g., using a user data locator 1A22) of the SPARQL query and/or the location of the XSL transformation in the <SPARQL_QUERY> and <XSLT> portions of the URL format using any of the following approaches:
Store the SPARQL queries and XSL transformations in the SPARQL gateway itself.
Store the SPARQL queries and XSL transformations in a file system directory.
Make the SPARQL queries and XSL transformations accessible from a Web site, and identified using a URL or URI.
Store the SPARQL queries and XSL transformations in a database.

Now, again referring to embodiments corresponding to the SPARQL gateway of FIG. 2, insertion and removal of SPARQL queries and XSLT transformations can be accomplished using a web-based user interface (e.g., Web UI 202).

Alternatively, insertion and removal of SPARQL queries and XSLT transformations can be accomplished using Java Programming APIs. More specifically, corresponding insertion and removal methods are provided in a Java library, possibly as a programming interface, and access to a stored SPARQL query and/or a stored SPARQL transform can be accomplished over such a programming interface (e.g., the programming interface shown as Java 204).

In exemplary embodiments, the SPARQL gateway subsumes a web service, and can reside on a server. In some cases, a SPARQL gateway can be run on the same intra-net as the RDF repository. Further, in certain situations, SPARQL query results can be cached to avoid repetitive executions, thereby improving performance.

Figure 4:
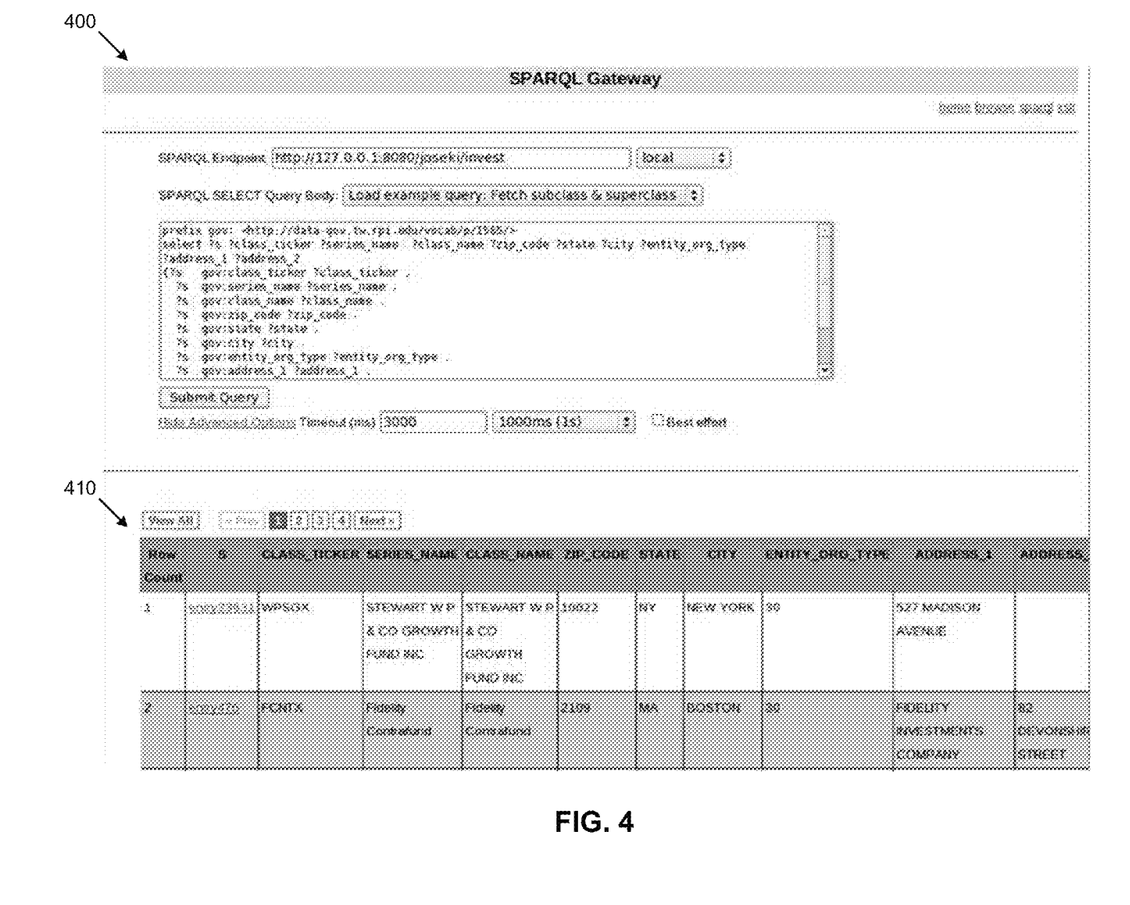
FIG. 4 is a graphic interface of a SPARQL query extractor engine for integrating applications with an RDF repository through a SPARQL gateway, according to some embodiments.

FIG. 4 is a graphic interface 400 of a SPARQL query extractor engine for integrating applications with an RDF repository through a SPARQL gateway.

As shown, a SPARQL query extractor engine can extract information from an RDF dataset. In the specific example shown, the RDF dataset describes a set of mutual funds. The extracted information includes series name, mutual fund ticker, state, address, etc. The extracted information from the SPARQL query response is presented in a tabular form 410, presented below the query.

FIG. 5 depicts transformed query results 500 as transformed by a SPARQL gateway used in a system integrating applications with an RDF repository through a SPARQL gateway.

The portion of XML given in FIG. 5 shows SPARQL gateway output for the SPARQL query of FIG. 4. Each item is wrapped inside a <row> tag, and each item is presented in the tabular form 410 of FIG. 4.

Figure 6:
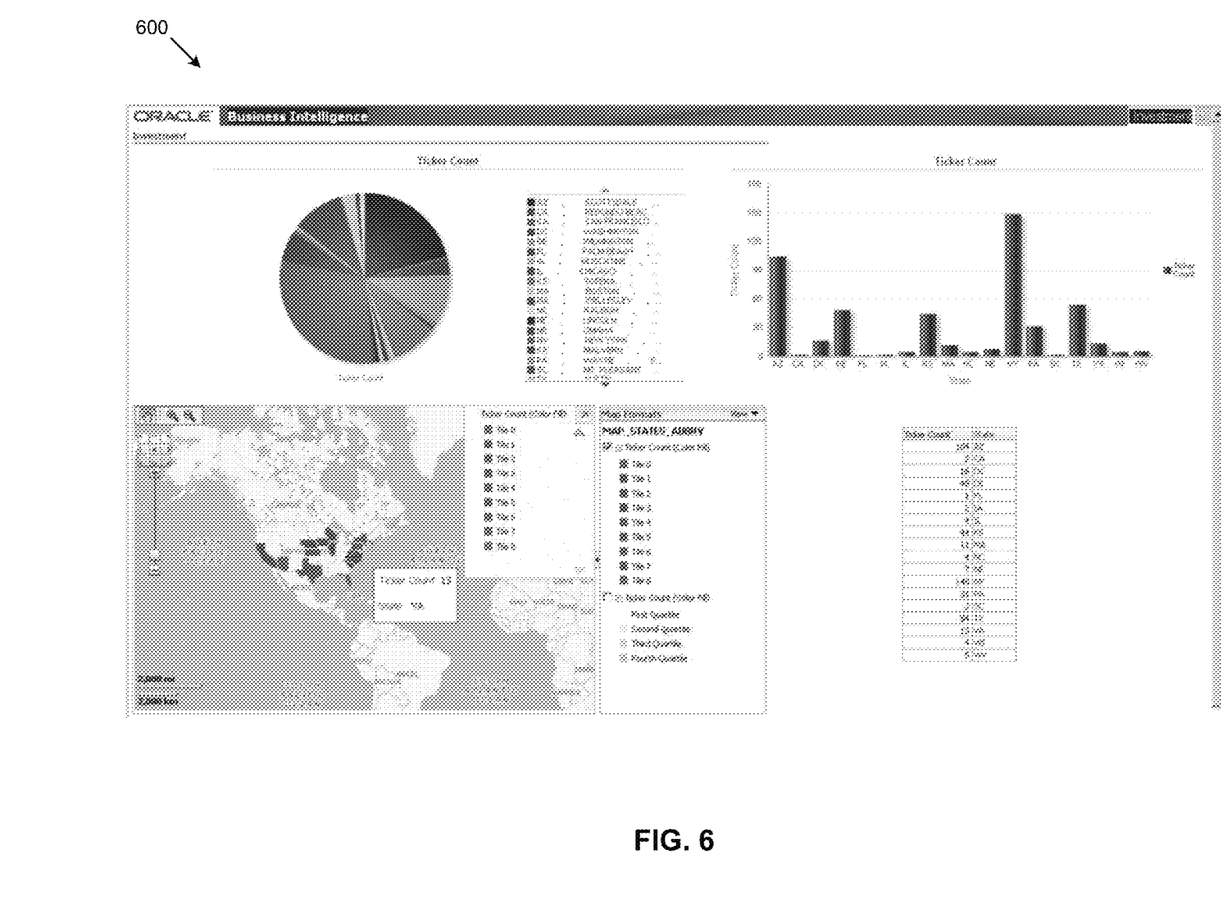
FIG. 6 depicts a graphic display constructed from SPAQL results as displayed by an enterprise application using a SPARQL gateway integrating applications with an RDF repository through a SPARQL gateway, according to some embodiments.

FIG. 6 depicts a graphic 600 as displayed by an enterprise application using a SPARQL gateway integrating applications with an RDF repository through a SPARQL gateway.

As shown, the graphic 600 is generated using the SPARQL gateway output. The graphic 600 plots a report showing the number of mutual funds with respect to different states, in the form of bar chart, pie chart, and map.

Portions of this report are generated using the SPARQL gateway output. Presentation of such a report shows the data distribution and identifies key information including which state hosts the largest number of mutual funds. As shown, the distribution is also presented geographically using a map.

ADDITIONAL EMBODIMENTS OF THE DISCLOSURE

Figure 7:
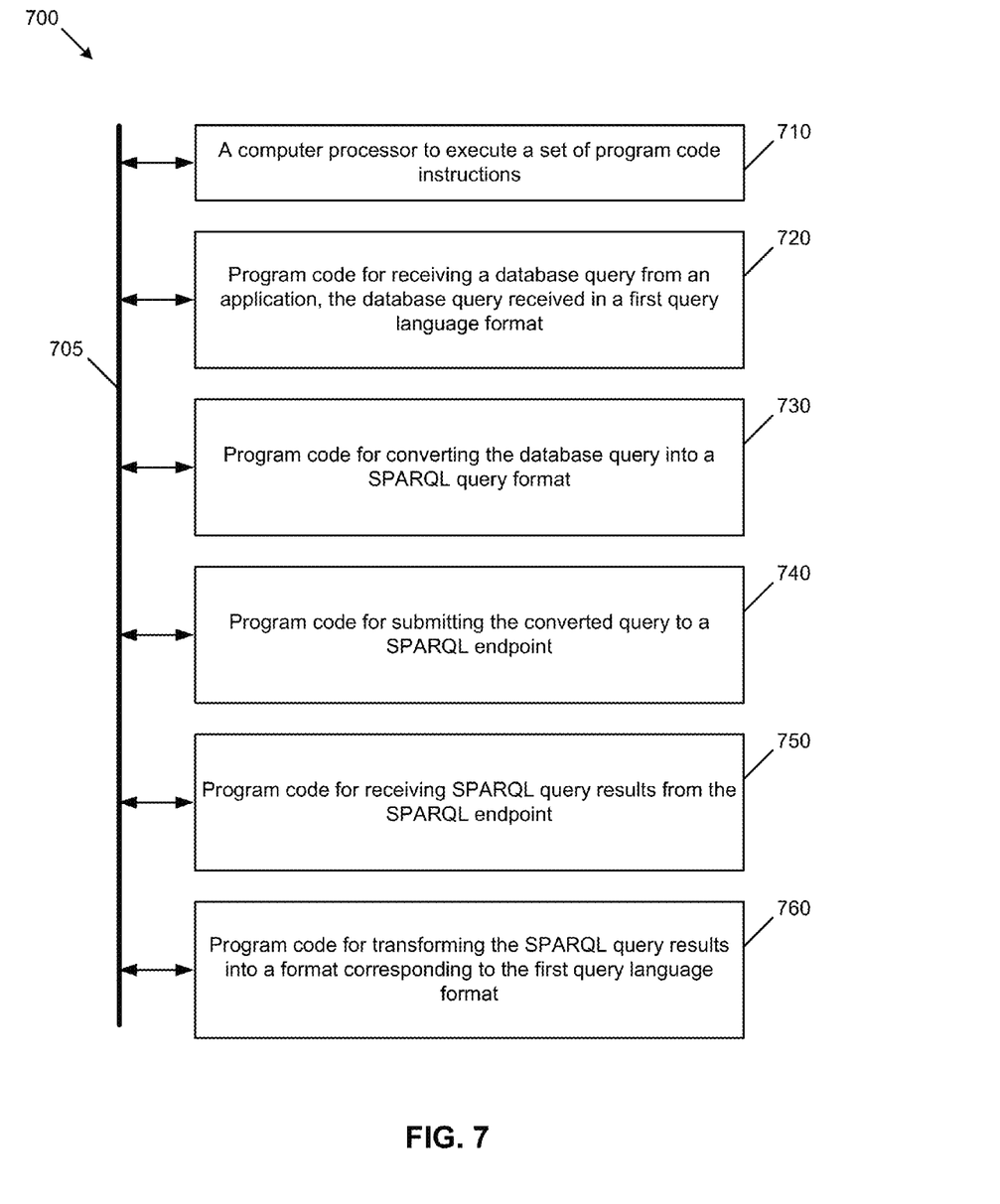
FIG. 7 depicts computer system for integrating applications with an RDF repository through a SPARQL gateway, according to some embodiments.

FIG. 7 depicts computer system for integrating applications with an RDF repository through a SPARQL gateway. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving, by a computer, a database query from an application, the database query received in a first query language format (see module 720); converting the database query into a SPARQL query format (see module 730); submitting the converted query to a SPARQL endpoint (see module 740); receiving SPARQL query results from the SPARQL endpoint (see module 750); and transforming the SPARQL query results into a format corresponding to the first query language format (see module 760).

System Architecture Overview

Figure 8:
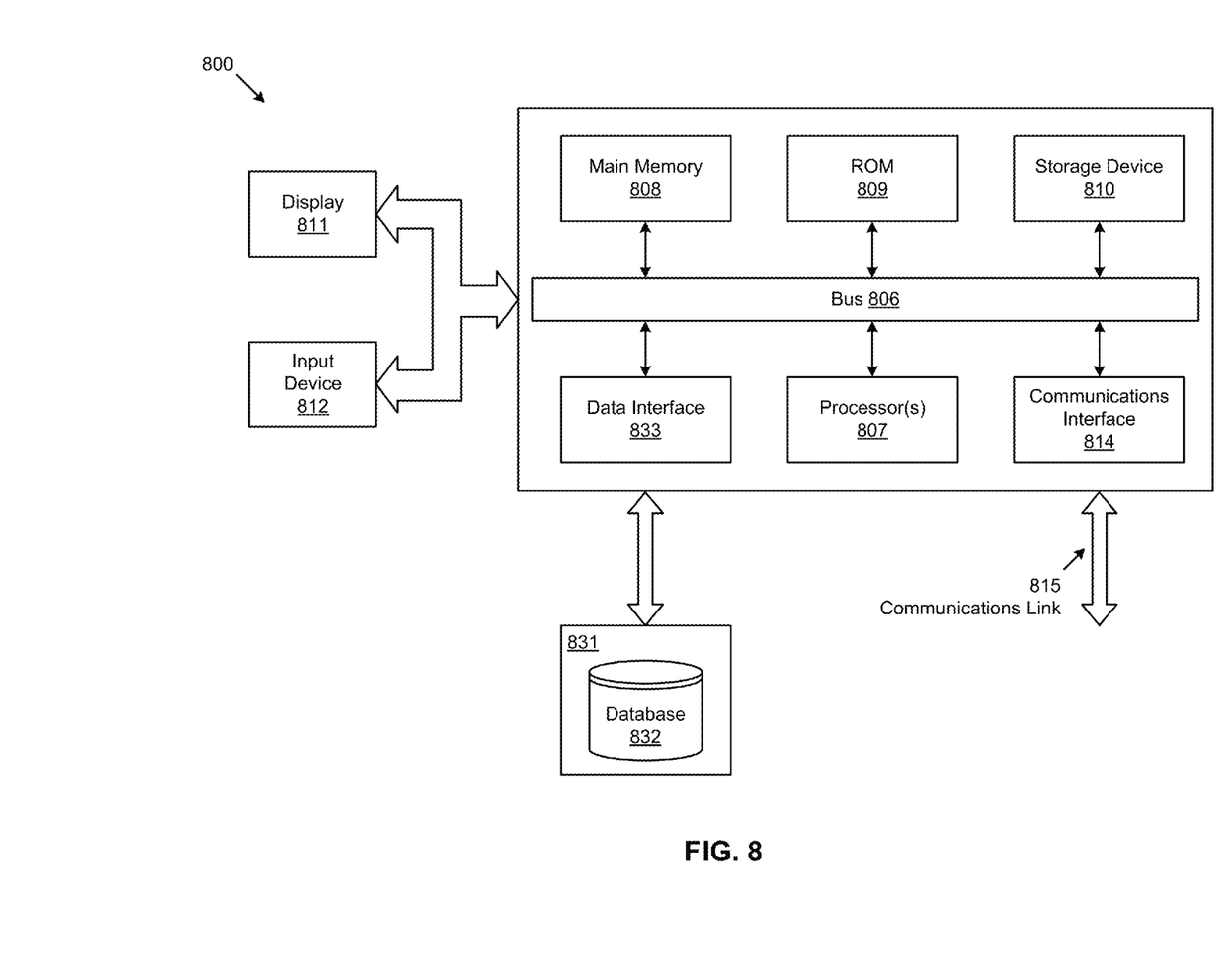
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to other embodiments of the disclosure, two or more computer systems 800 coupled by a communication link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communication link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for accessing an RDF (resource description framework) repository through a SPARQL (SPARQL Protocol and RDF Query Language) gateway, the method comprising:
   receiving, by the SPARQL gateway running on a computer having a processor, a database query, the database query received in a first query language format;
   converting the database query into a SPARQL query format;
   submitting the converted query to a SPARQL endpoint;
   receiving, by the SPARQL gateway, SPARQL query results from the SPARQL endpoint; and
   transforming the SPARQL query results into a format corresponding to the first query language format, wherein the format is not an XML format.

2. The method of claim 1, wherein the first query language format is SQL.

3. The method of claim 1, further comprising sending the transformed SPARQL query results to at least one of, a database engine, or a database application.

4. The method of claim 1, wherein submitting the converted query to a SPARQL endpoint comprises submitting a first converted query with a first LIMIT clause and a second converted query with a second LIMIT clause.

5. The method of claim 1, wherein transforming the SPARQL query results uses an XSLT processor.

6. The method of claim 1, wherein converting the database query into a SPARQL query format comprises determining that the database query can be converted into more than one equivalent SPARQL query, and selecting the fastest one from among the more than one equivalent SPARQL queries.

7. The method of claim 1, wherein converting the database query into a SPARQL query format comprises converting an aspect of an SQL query into a corresponding RDF construct.

8. A computer system for accessing an RDF repository through a SPARQL gateway, comprising:
- a computer processor to execute a set of program code instructions; and
- a memory to hold the program code instructions, in which the program code instructions comprises program code to perform,
- receiving, by a SPARQL gateway, a database query, the database query received in a first query language format;
- converting the database query into a SPARQL query format;
- submitting the converted query to a SPARQL endpoint;
- receiving by the SPARQL gateway, SPARQL query results from the SPARQL endpoint; and
- transforming the SPARQL query results into a format corresponding to the first query language format, wherein the format is not an XML format.

9. The computer system of claim 8, wherein the first query language format is SQL.

10. The computer system of claim 8, further comprising sending the transformed SPARQL query results to at least one of, a database engine, or a database application.

11. The computer system of claim 8, wherein submitting the converted query to a SPARQL endpoint comprises submitting a first converted query with a first LIMIT clause and a second converted query with a second LIMIT clause.

12. The computer system of claim 8, wherein transforming the SPARQL query results uses an XSLT processor.

13. The computer system of claim 8, wherein converting the database query into a SPARQL query format comprises determining that the database query can be converted into more than one equivalent SPARQL query, and selecting the fastest one from among the more than one equivalent SPARQL queries.

14. The computer system of claim 8, wherein converting the database query into a SPARQL query format comprises converting an aspect of an SQL query into a corresponding RDF construct.

15. A computer program product embodied in a non-transitory computer readable medium, the computer readable medium having stored thereon a sequence of instructions which, when executed by a processor causes the processor to execute a process to access an RDF repository through a SPARQL gateway, the process comprising:
- receiving, by the SPARQL gateway, a database query, the database query received in a first query language format;
- converting the database query into a SPARQL query format;
- submitting the converted query to a SPARQL endpoint;
- receiving by the SPARQL gateway, SPARQL query results from the SPARQL endpoint; and
- transforming the SPARQL query results into a format corresponding to the first query language format, wherein the format is not an XML format.

16. The computer program product of claim 15, wherein the first query language format is SQL.

17. The computer program product of claim 15, further comprising sending the transformed SPARQL query results to at least one of, a database engine, or a database application.

18. The computer program product of claim 15, wherein submitting the converted query to a SPARQL endpoint comprises submitting a first converted query with a first LIMIT clause and a second converted query with a second LIMIT clause.

19. The computer program product of claim 15, wherein transforming the SPARQL query results uses an XSLT processor.

20. The computer program product of claim 15, wherein converting the database query into a SPARQL query format comprises determining that the database query can be converted into more than one equivalent SPARQL query, and selecting the fastest one from among the more than one equivalent SPARQL queries.

* * * * *

UNITED STATES PATENT AND TRADEMARK OFFICE
CERTIFICATE OF CORRECTION

| | | |
|---|---|---|
| PATENT NO. | : 8,949,225 B2 | Page 1 of 1 |
| APPLICATION NO. | : 13/477362 | |
| DATED | : February 3, 2015 | |
| INVENTOR(S) | : Wu | |

It is certified that error appears in the above-identified patent and that said Letters Patent is hereby corrected as shown below:

Title Page, item (56)

On page 2, column 1, under Other Publications, line 1, delete "Exwcutable" and insert -- Executable --, therefor.

On page 2, column 2, under Other Publications, line 2, delete "Jounal" and insert -- Journal --, therefor.

On page 2, column 2, under Other Publications, line 2, delete "Semenatics," and insert -- Semantics, --, therefor.

On page 2, column 2, under Other Publications, line 4, delete ".prg/" and insert -- .org/ --, therefor.

On page 2, column 2, under Other Publications, line 15, delete "2011," and insert -- 2011-12, --, therefor.

On page 2, column 2, under Other Publications, line 31, delete "Databse"," and insert -- Database", --, therefor.

Signed and Sealed this
Twenty-fourth Day of November, 2015

Michelle K. Lee
*Director of the United States Patent and Trademark Office*